(12) United States Patent
Wittenberg et al.

(10) Patent No.: US 12,101,130 B2
(45) Date of Patent: Sep. 24, 2024

(54) VERY LOW FREQUENCY SIGNALS FOR UNDERWATER COMMUNICATIONS

(71) Applicants: The Boeing Company, Chicago, IL (US); HRL Laboratories, LLC, Malibu, CA (US)

(72) Inventors: Peter Wittenberg, Creve Coeur, MO (US); Peter Petre, Oak Park, CA (US)

(73) Assignees: The Boeing Company, Chicago, IL (US); HRL Laboratories, LLC, Malibu, CA (US)

( * ) Notice: Subject to any disclaimer, the term of this patent is extended or adjusted under 35 U.S.C. 154(b) by 325 days.

(21) Appl. No.: 17/653,800

(22) Filed: Mar. 7, 2022

(65) Prior Publication Data
US 2023/0308192 A1 Sep. 28, 2023

(51) Int. Cl.
*H04B 13/02* (2006.01)
*H04B 1/04* (2006.01)
*H04B 1/10* (2006.01)

(52) U.S. Cl.
CPC ........... *H04B 13/02* (2013.01); *H04B 1/0475* (2013.01); *H04B 1/10* (2013.01)

(58) Field of Classification Search
CPC ........ H04B 13/02; H04B 1/0475; H04B 1/10; H04B 1/005
See application file for complete search history.

(56) References Cited

U.S. PATENT DOCUMENTS

| | | | |
|---|---|---|---|
| 10,404,299 B1 * | 9/2019 | Petre | H04B 1/10 |
| 11,037,057 B1 * | 6/2021 | Virbila | H04B 1/719 |
| 11,143,721 B2 | 10/2021 | Gerginov | |
| 2006/0286931 A1 * | 12/2006 | Rhodes | H04B 13/02 455/40 |
| 2007/0209865 A1 * | 9/2007 | Kokosalakis | H04B 11/00 181/0.5 |
| 2013/0195465 A1 * | 8/2013 | Rhodes | H04B 13/02 398/104 |
| 2013/0196593 A1 * | 8/2013 | Roper | H04B 13/02 455/40 |
| 2018/0076795 A1 * | 3/2018 | Petre | H04B 1/719 |

(Continued)

FOREIGN PATENT DOCUMENTS

WO 2018136144 A1 7/2018

OTHER PUBLICATIONS

European Patent Office Extended Search Report, dated Jul. 25, 2023, regarding Application No. EP23153561.8, 12 pages.

(Continued)

*Primary Examiner* — MD K Talukder
(74) *Attorney, Agent, or Firm* — Yee & Associates, P.C.

(57) ABSTRACT

A method, apparatus, system, and computer program product for processing low frequency signals. A communications system comprising a low frequency receiver, a denoiser, and a signal extractor. The low frequency receiver receives low frequency signals in which a communications signal is expected. The denoiser is in communication with the low frequency receiver. The denoiser denoises the low frequency signals received from the low frequency receiver. The denoising results in a generation of denoised signals. The signal extractor in communication with the denoiser. The signal extractor extracts the communications signal from the denoised signal.

21 Claims, 9 Drawing Sheets

(56) References Cited

U.S. PATENT DOCUMENTS

| | | | |
|---|---|---|---|
| 2018/0099733 A1* | 4/2018 | Sato | H04B 11/00 |
| 2020/0186177 A1* | 6/2020 | Gorbachov | H03F 7/04 |
| 2021/0099228 A1* | 4/2021 | Alam | H04B 13/02 |
| 2022/0140903 A1* | 5/2022 | Ooi | H04B 10/11 |
| | | | 398/209 |
| 2023/0308192 A1* | 9/2023 | Wittenberg | H04B 1/10 |

OTHER PUBLICATIONS

Ingleby et al., "Resonant Very Low-and Ultra Low Frequency Digital Signal Reception Using a Portable Atomic Magnetometer," ARXIV.org, Cornell University Library, 201 Olin Library Cornell University Ithaca, NY 14853, Mar. 6, 2020, XP081615250, 8 pages.
Unknown, "VLF (Very Low Frequency) Quantum Magnetic Field REceiver With Ambient Noise Suppression", University of Boulder; Colorado, Sep. 9, 2021, pp. 1-2, XP093063324, Retrieved from the Internet: URL: https://colorado-boulder.portals.in[part.com/eYdN1VMpgzBG?utm_source=technologies&utm_medium=portal [retrieved on Jul. 12, 2023].
"Extremely Low Frequency Transmitter Site Clam Lake, Wisconsin," The United States Navy, Navy Fact File, 2001, 4 pages.

* cited by examiner

VERY LOW FREQUENCY SIGNALS FOR UNDERWATER COMMUNICATIONS

BACKGROUND INFORMATION

1. Field

The present disclosure relates generally to communications with submarines using very low frequencies and in particular, to denoising to improve communication at very low frequencies.

2. Background

Communicating with an underwater vehicle can be challenging especially when the underwater vehicle is submerged. Very low frequency (VLF) signals have been used for communications. A very low frequency signal can penetrate at least 40 meters into ocean water. This type of signal is typically used to communicate with underwater platforms such as submarines.

This type of signal attenuates as the signal travels through the ocean. As result, the use of very low frequency (VLF) signals has limited bandwidth that can result in low data rates.

Therefore, it would be desirable to have a method and apparatus that take into account at least some of the issues discussed above, as well as other possible issues. For example, it would be desirable to have a method and apparatus that overcome a technical problem with low data rates that occur in communications using very low frequency signals.

SUMMARY

An embodiment of the present disclosure provides a communications system comprising a low frequency receiver, a denoiser, and a signal extractor. The low frequency receiver receives low frequency signals in which a communications signal is expected. The denoiser is in communication with the low frequency receiver. The denoiser denoises the low frequency signals received from the low frequency receiver. The denoising results in a generation of denoised signals. The signal extractor is in communication with the denoiser. The signal extractor extracts the communications signal from the denoised signal.

In another embodiment of the present disclosure, a communications system comprises a quantum magnetometer very low frequency receiver, a cognitive signal processor, a filter system, and a signal extractor. The quantum magnetometer very low frequency receiver detects very low frequency signals. The cognitive signal processor is in communication with the quantum magnetometer very low frequency receiver. The cognitive signal processor denoises the very low frequency signals received from the quantum magnetometer very low frequency receiver. The denoising results in a generation of denoised signals. The filter system is located in a neural network in the cognitive signal processor. The filter system comprises at least one of a bandpass filter or a band reject filter. The signal extractor is in communication with the cognitive signal processor. The signal extractor extracts a communications signal from the denoised signal.

In yet another embodiment of the present disclosure, a method processes low frequency signals. The low frequency signals in which a communications signal is expected are received by a low frequency receiver. The low frequency signals received from the low frequency receiver are denoised by a denoiser. The denoising results in a generation of denoised signals. The communications signal is extracted from the denoised signal by a signal extractor.

In still another embodiment of the present disclosure, a computer program product for processing very low frequency signals comprises a computer readable storage medium having program code embodied therewith. The program code are executable by a computer system to cause the computer system to perform a method of receiving, by a low frequency receiver, low frequency signals in which a communications signal is expected; denoising, by a denoiser, the low frequency signals received from the low frequency receiver, wherein the denoising results in a generation of denoised signals; and extracting, by a signal extractor, the communications signal from the denoised signal.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
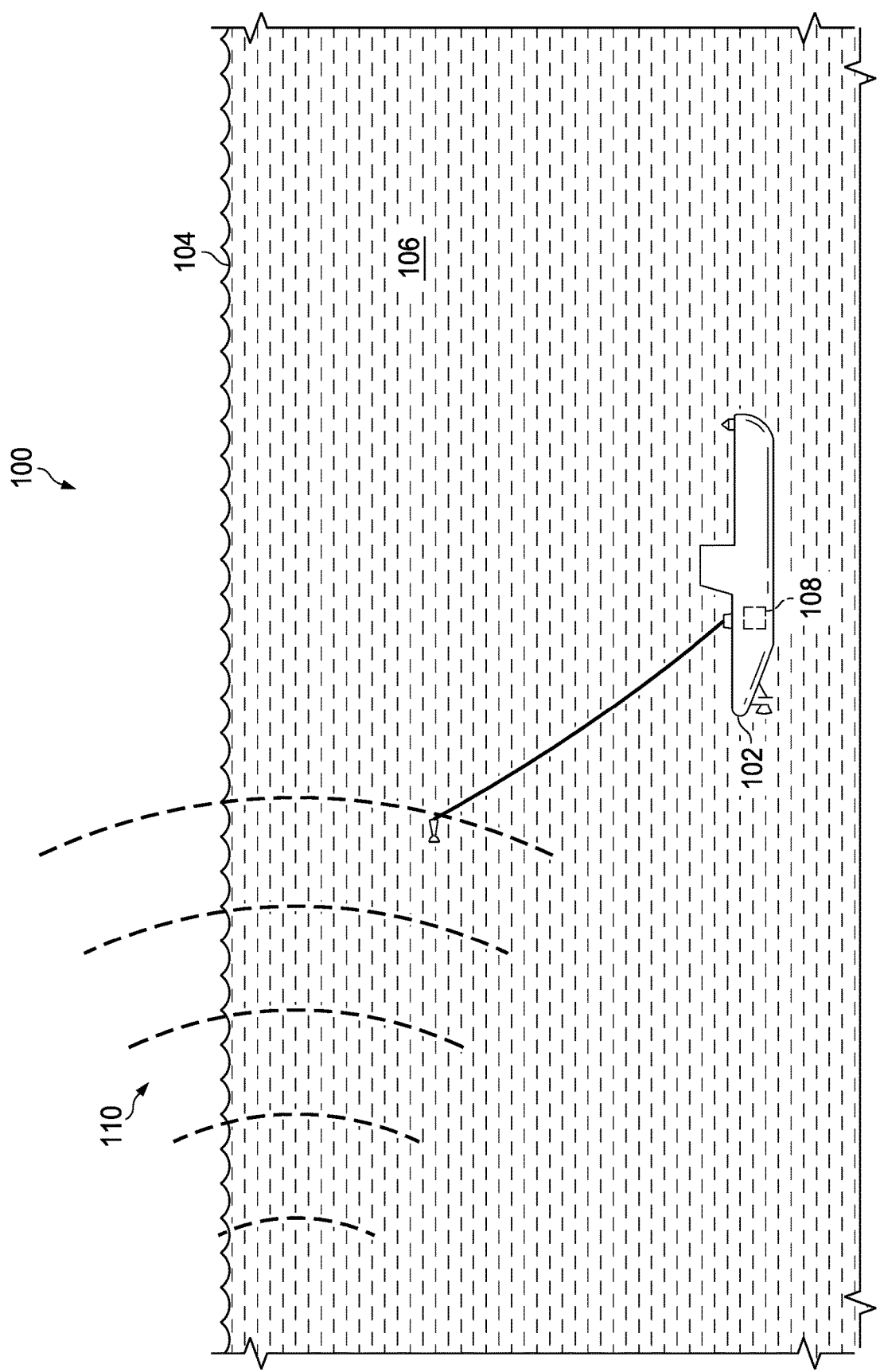
FIG. 1 is an illustration of a communications environment in accordance with an illustrative embodiment.

The illustrative embodiments recognize and take into account one or more different considerations as described herein. For example, increasing the signal-to-noise ratio (SNR) in a communications system can increase at least one of the bit rate or depth at which very low frequency signals can be received.

As used herein, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Increasing the signal-to-noise ratio in radio frequency signals can be achieved by reducing noise in signals. In one illustrative example, a denoiser can be used to increase the signal-to-noise ratio in very low frequency signals. A denoiser has a nonlinear time varying very filter that can be configured to remove thermal noise from signals, such as very low frequency (VLF) signals. Very low frequency signals do not have a large bandwidth compared to electronic wideband receiver applications. In other words, the illustrative embodiments recognize and take into account that very low frequency communications have a signal bandwidth that is relatively low as compared to other applications using more conventional communications bandwidths.

Configuring a denoiser to remove noise and increase the signal noise ratio (SNR) for communications using very low frequency signals for communications using very low frequency signals takes less processing resources as compared to other communications implementations that use broader ranges of frequencies. As a result, a hardware implementation can be more easily achieved. For example, an integrated circuit such as a field programmable gate array (FPGA) can be configured with just a few nodes for a neural network using fewer processing resources as compared to wider bandwidth applications. Thus, an illustrative example can be implemented in field programmable gate array (FPGA) currently used for other types of communications using less resources.

Therefore, with recognizing and taking into account these different considerations, illustrative examples can provide a method, system, apparatus, and computer program product for processing radio frequency signals in such as very low frequency (VLF) signals that increases at least one of the bit rate or depth at which very low frequency signals can be received.

With reference now to the figures in particular with reference to FIG. 1, an illustration of a communications environment is depicted in accordance with an illustrative embodiment. In communications environment 100, submarine 102 is located below surface 104 of ocean 106.

As depicted, submarine 102 includes a communications system 108 that enables receiving and sending communications while located underwater in ocean 106. In the illustrative example, these communications can be achieved using very low frequency (VLF) signals 110. In this example, a very low frequency signal is an electromagnetic signal that has a frequency from 3 kHz to 30 kHz. These types of signals can typically penetrate water to a few tens of meters, enabling submarine 102 to communicate at shallow depths. For example, with a traditional antenna operating at 3 kHz, submarine 102 can communicate at a depth of about 13 m. With a gas magnetometer operating at 3 kHz, submarine 102 can receive very low frequency signals at a depth of about 70 m.

In illustrative example, greater depths for communications are achieved by submarine 102 using communications system 112 as compared to currently available communications systems. In this illustrative example, communications system 112 is configured to provide increased signal-to-noise ratio (SNR) that enables submarine 102 to communicate using at least one of an increased bit rate and detecting transmissions or an increased depth. This increased performance can be enabled in communications system 112 through the use of a receiver and a denoiser in communications system 112.

In this example, the denoiser can reduce noise by 40 dB to 60 dB resulting in an increased signal-to-noise ratio. With this increased signal-to-noise ratio, submarine 102 can be submerged deeper, the bit rate can be increased, or submarine 102 can be submerged deeper with an increased bit rate. For example, depths greater than 70 m can be achieved in which communications can be received by submarine 102. As another example, the bit rate can be increased by 10 times the bit rate for the same bandwidth that is currently available.

Figure 2:
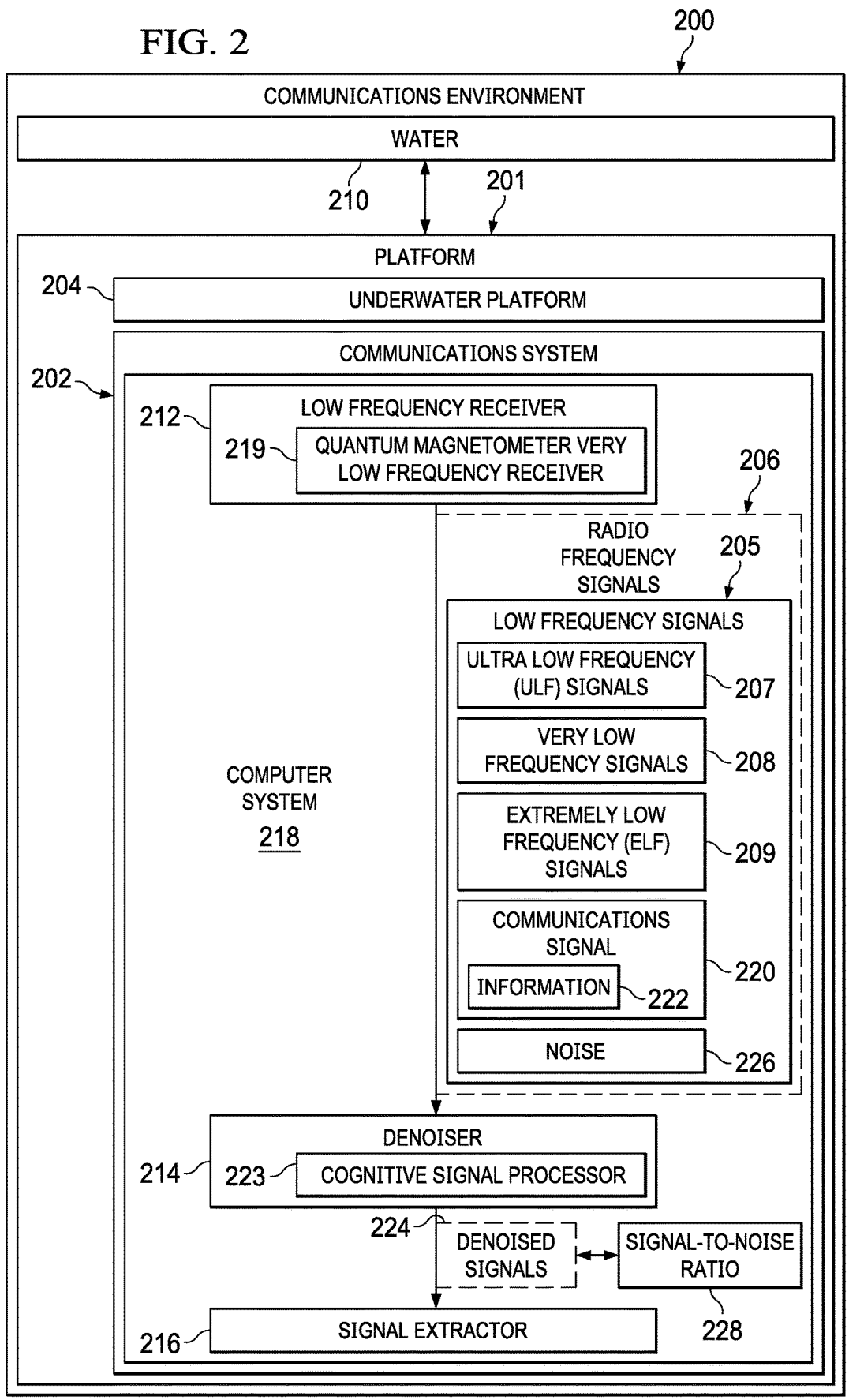
FIG. 2 is an illustration of a block diagram of a communications environment in accordance with an illustrative embodiment.

With reference now to FIG. 2, an illustration of a block diagram of a communications environment is depicted in accordance with an illustrative embodiment. In this example, communications environment 200 is an environment in which platform 201 can communicate using communications system 202. In this example, platform 201 is an underwater platform 204.

In this illustrative example, underwater platform 204 can take a number of different forms. For example, underwater platform can be selected from a group comprising a stationary underwater platform, a mobile underwater platform, a submarine, a submersible vehicle, an autonomous underwater vehicle, an underwater research station, an underwater habitat, an underwater drone, and an underwater remotely operated vehicle. Communications system 112 in FIG. 1 can be implemented using Communications system 202 depicted in this figure.

Communications system 202 can provide communications via radio frequency signals 206 such as low frequency signals 205. Low frequency signals can be selected from at least one of extremely low frequency (ELF) signals 209, ultra low frequency (ULF) signals 207 very low frequency signals 208, or other signals having a frequency of about 30 kHz or less. An extremely low frequency (ELF) signal has a frequency range from 3 Hz to 30 Hz. An ultra low frequency signal has a frequency in a range from about 300 Hz to 3 KHz. A very low frequency (VLF) signal has a frequency in a range from 3 kHz to 30 kHz, which corresponds to wavelengths from 100 km to 10 km respectively.

In this illustrative example, underwater platform 204 can receive low frequency signals 205 while submerged in water 210. In this illustrative example, water 210 can be, for example, an ocean, a sea, a lake, or some other body of water.

In this illustrative example, communications system 202 comprises a number of different components. As depicted, communications system 202 comprises low frequency receiver 212, denoiser 214, signal extractor 216, and computer system 218.

Computer system 218 is located in platform 201. In this illustrative example, low frequency receiver 212, denoiser 214, and signal extractor 216 can be located in computer system 218. In other words, these functional blocks can be components implemented as part of computer system 218. These components can be at least one of hardware components or software components in computer system 218.

At least one of low frequency receiver 212, denoiser 214, and signal extractor 216 can be implemented in software, hardware, firmware or a combination thereof. When software is used, the operations performed by at least one of low frequency receiver 212, denoiser 214, and signal extractor 216 can be implemented in program code configured to run on hardware, such as a processor unit. When firmware is used, the operations performed by at least one of low frequency receiver 212, denoiser 214, and signal extractor 216 at least one of low frequency receiver 212, denoiser 214, and signal extractor 216 can be implemented in program code and data and stored in persistent memory to run on a processor unit. When hardware is employed, the hardware can include circuits that operate to perform the operations in at least one of low frequency receiver 212, denoiser 214, and signal extractor 216.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. In some illustrative examples, quantum circuits can be used to implement the processes in these components. Additionally, the processes can be implemented in organic components integrated with inorganic components and can be comprised entirely of organic components excluding a human being. For example, the processes can be implemented as circuits in organic semiconductors.

Computer system 218 is a physical hardware system and includes one or more data processing systems. When more than one data processing system is present in computer system 218, those data processing systems are in communication with each other using a communications medium. The communications medium can be a network. The data processing systems can be selected from at least one of a computer, a server computer, a tablet computer, or some other suitable data processing system.

As depicted, low frequency receiver 212 can be implemented using any type of receiver system that can receive radio frequency signals 206 such as low frequency signals 205. In one illustrative example, low frequency receiver 212 is quantum magnetometer very low frequency receiver 219.

A quantum magnetometer is a device that measures the strength and direction of magnetic fields based on the spin of subatomic particles such as nuclei and unpaired valence electrons. The spin of nuclei and unpaired valence electrons is associated with the magnetic strength and orientation of a magnet that produces a magnetic field. Quantum magnetometers includes proton magnetometers, overhauser magnetometers, optically pumped magnetometers, cesium magnetometer, and potassium magnetometer.

In this example, the magnetic fields can be used for communications. The magnetic fields in low frequency signals 205 are less prone to attenuation in water 210 than other using higher frequencies. Quantum magnetometer very low frequency receiver 219 can be configured to receive very low frequency signals in magnetic fields that encompass frequency in range of 3 kHz Hz to 30 kHz.

In this illustrative example, low frequency signals 205 are received in which communications signal 220 is expected. In one example, communications signal 220 can be a low frequency signal that contains information 222. This information can be, for example, data, program code, voice, images, or other suitable types of information.

In this illustrative example, denoiser 214 is in communication with low frequency receiver 212. In other words, denoiser 214 can receive low frequency signals 205 detected by low frequency receiver 212.

Denoiser 214 can be implemented using cognitive signal processor 223. Cognitive signal processor 223 is a data processing system that uses neural network in the form of a reservoir. Denoiser 214 operates to denoise low frequency signals 205 received from low frequency receiver 212.

In this illustrative example, denoiser 214 operates to predict low frequency signals 205 that will be received. The prediction can be for several samples ahead of low frequency signals 205 that have been received for processing. In this illustrative example, the prediction performed by denoiser 214 does not predict noise 226 in low frequency signals 205. As result, noise does not pass through denoiser 214.

This denoising in generating of denoised signals 224 results in denoised signals 224 that have a reduction in noise 226 as compared to noise 226 in low frequency signals 205 received from low frequency receiver 212. The reduction in noise 226 may not eliminate all noise but provides an improvement in reducing the level of noise 226 that make it easier to identify communications signal 220. For example, the reduction of noise 226 increases signal-to-noise ratio (SNR) 228 in denoised signals 224.

For example, noise 226 in denoised signals 224 can have a reduction in noise from about 40 dB to 60 dB when using low frequency receiver 212 in the form of quantum magnetometer very low frequency receiver 219 and denoiser 214 in the form of cognitive signal processor 223 to receive low frequency signals 205 in the form of very low frequency signals 208. As a result, signal-to-noise ratio 228 can in a manner that allows for underwater platform 204 to be located deeper under water 210, increasing the bit rate, or a combination thereof when receiving very low frequency signals 208.

As depicted, signal extractor 216 is in communication with denoiser 214. Signal extractor 216 receives denoised signals 224 from denoiser 214. Signal extractor 216 extracts communications signal 220 encoding information 222 from the denoised signals 224. In this manner, communications system 202 can receive information 222.

Figure 3:
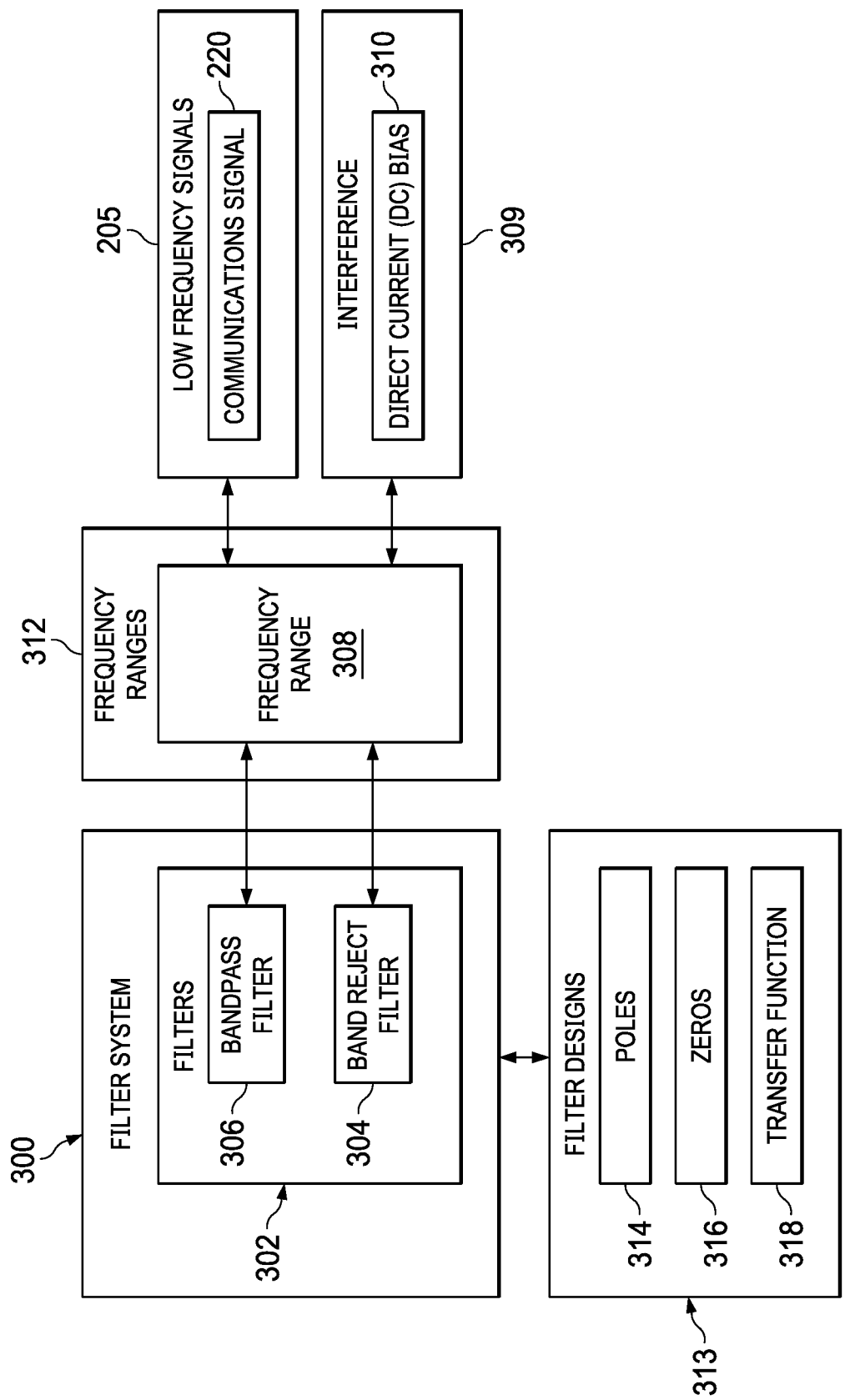
FIG. 3 is an illustration of a filter system in a cognitive signal processor in accordance with an illustrative embodiment.

With reference to FIG. 3, an illustration of a filter system in a cognitive signal processor is depicted in accordance with an illustrative embodiment. In the illustrative examples, the same reference numeral may be used in more than one figure. This reuse of a reference numeral in different figures represents the same element in the different figures.

The illustrative example, filter system 300 can be implemented in denoiser 214 to further increase the reduction of noise 226 in low frequency signals 205. As depicted, filter system 300 comprises a set of filters 302. The set of filters 302 can be selected from least one of bandpass filter 304, band reject filter 306, or some other suitable type of filter that can be implemented within denoiser 214.

Bandpass filter 304 can be configured to pass very low frequency signals 208 in frequency range 308. For example, bandpass filter 304 can passes low frequency signals 205 in frequency range 308 in which communications signal 220 is expected be present in low frequency signals 205 received from the low frequency receiver 212.

As another example, band reject filter 306 rejects frequency range 308 in low frequency signals 205 in which interference 309 is present. In one example, interference 309 can be direct current (DC) bias 310 present from the magnetic field of the earth. This direct current bias shows up as a zero frequency because the magnetic field of the earth does not change quickly relative to other types of magnetic fields such as those used for communications.

In this illustrative example, band reject filter 306 provides for bias rejection to reject and undesired signal separate from reducing noise using bandpass filter 304. In this manner, undesired signals that are known can be rejected.

The rejection of frequency range 308 removes direct current bias 310 in low frequency signals 205. In this illustrative example, direct current bias 310 can be present in low frequency signals 205 detected by low frequency receiver 212 that is a magnetic field-based receiver such as quantum magnetometer very low frequency receiver 219. With magnetometer type receivers, the magnetic field of the earth has a frequency of zero varies very little and is treated as a constant that manifests as direct current bias 310.

In other examples interference 309 can take other forms such as intentional hostile jamming in addition or in place of direct current bias 310.

Filter system 300 can include multiple bandpass filters to allow the passage of different frequency ranges in which communications signal 220 may be present in very low frequency signals 208. Filter system 300 can also include multiple band reject filters to reject frequency ranges 312 for at least one undesired noise, artifacts, or other undesired frequencies such as direct current bias 310.

As result, filter system 300 can be configured to operate to pass at least one of a set of frequency ranges 312 or reject a set of frequency ranges 312. Filter system 300 in denoiser 214 can provide a complex filter configuration having a mix of bandpasses in some frequencies and band rejects in other frequencies.

In this illustrative example, filter system 300 can be implemented using filter designs 313 that describe filters 302 in filter system 300 using poles 314 and zeros 316. The placement of poles 314 and zeros 316 describe the behavior of a filter in filter system 300.

In this illustrative example, the input signals applied to filter can have some desired shape as an output. This output and input relationship can be written as transfer function 318. The output of the transfer function is an amplitude response of the filter at different frequencies.

For example, transfer function 318 can be represented as the ratio of two polynomials. For example, transfer function 318 can be as follows:

H (s)=N (s)/D (s) where N(s) in the numerator and D(s) in the denominator. In this expression, the roots of the polynomial in the denominator D(s) are poles 314. The roots of N (s), located in the numerator, are zeros 316. In other words, the zeros of transfer function 318 are values of s that makes N (s)=0, which in turns makes the transfer function H(s)=0. The poles of the transfer function H (s) are values of s that makes the D(s)=0, which in turns makes the transfer function H (s)=infinity.

When illustrating the transfer function of H (w) of frequency w with a plot of frequency versus amplitude response of the filter, the zeroes appear at frequencies where the response is minimal on the plot, and the poles appear at frequencies where the response is peaked in the plot. For example, a bandpass filter can have a pole at the center frequency and two zeroes at the cut off frequencies.

Poles 314 in transfer function 318 are also affected by the quality factor Q, which indicate how close to perfect a filter or filter component can be for a particular design. As Q increases, the filter is considered to be better with lower the losses. For an inductor or capacitor, Q is the ratio of the reactance to the resistance. In this case, the Q of an inductor equals to wL/R, and the Q of a capacitor equals to 1/wCR, where R in both instance is the resistance, while w is the frequency, C is the capacitance, and L and R are the reactance.

The quality factor Q can be substituted into transfer function 318 to calculate poles 314 and zeroes 316 for given transfer function 318. Thus, in w and Q affect the value of poles 314 and location of poles 314 on the frequencies versus amplitude response plot.

For example, for the illustration of a frequencies versus amplitude response plot of a second-order lowpass filter, varying the frequency w changes the pole's distance from the origin, decreasing the Q moves the poles towards each other, and increasing the Q moves the poles in a semicircle away from each other and toward the frequency axis.

Poles 314 and zeros 316 can be used to configure denoiser 214 to provide desired bandpass and band reject characteristics in processing low frequency signals 205 to obtain denoised signals 224. The use of filter system 300 can further increase the ability of denoiser 214 to reduce noise in low frequency signals 205.

Figure 4:
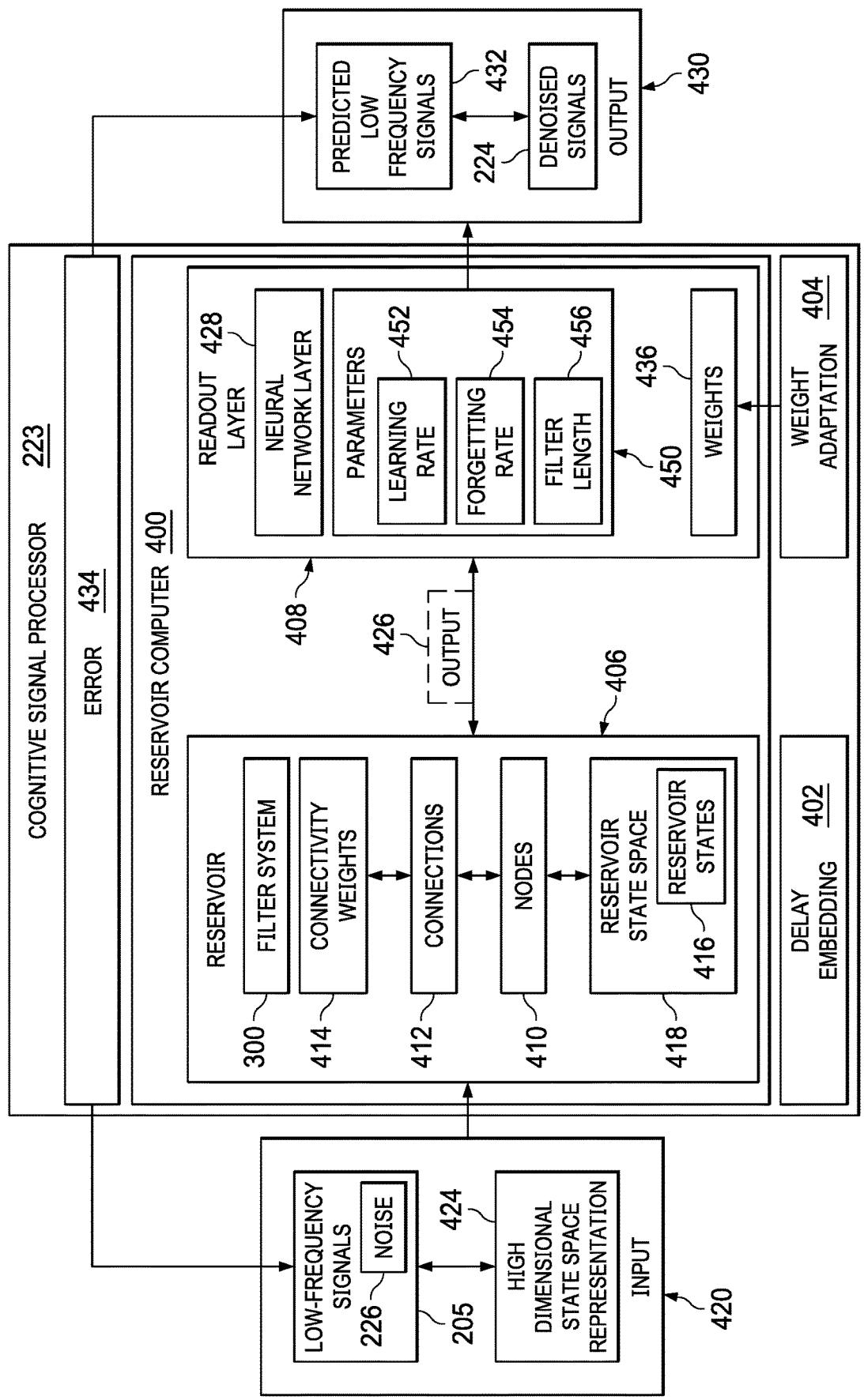
FIG. 4 is an illustration of a cognitive signal processor in accordance with an illustrative embodiment.

Turning to FIG. 4, an illustration of a cognitive signal processor is depicted in accordance with an illustrative embodiment. In this figure, an example of one implementation for cognitive signal processor 223 is shown.

Cognitive signal processor 223 comprises a number of different components. As depicted, cognitive signal processor 223 comprises reservoir computer 400, delay embedding 402, and weight adaptation 404.

Reservoir computer 400 can be implemented using currently known reservoir computing techniques and architectures. For example, reservoir computer using a recurrent neural network with individual nonlinear units and is capable of storing information. The nonlinearity describes the response of each unit to input enabling solving complex problems. In this illustrative example, reservoir computer 400 comprises reservoir 406 and readout layer 408.

Reservoir 406 contains nodes 410. Connections 412 between nodes 410 have connectivity weights 414. In this illustrative example, connectivity weights 414 define the strength of connections 412 between nodes 410.

In reservoir 406, information can be stored using nodes 410 as reservoir states 416 in reservoir state space 418 in reservoir computer 400 by connecting nodes 410 in reservoir 406 in recurrent loops with previous input in the next response.

In this example, reservoir 406 can receive input 420. Input 420 can be low frequency signals 205 that may include a desired signal such as communications signal 220. In this example, low frequency signals 205 are noisy signals that can also include an expected communication signal. In other words, low frequency signals 205 in input 420 can include both noisy signals and desired communications signals.

In this example, low frequency signals 205 in input 420 are mapped to reservoir states 416 in reservoir 406.

Mapping low frequency signals 205 in input 420 to reservoir states 416 in reservoir state space 418 can provide high dimensional state space representation 424 of low frequency signals 205 in input 420 in reservoir 406.

In this illustrative example, readout layer 408 receives output 426 from reservoir 406. Readout layer 408 includes neural network layer 428 that can perform a linear transformation on output 426 from reservoir 406. In some illustrative examples, readout layer 408 can be comprised of more than one neural network layer.

Readout layer 408 can be configured through training to generate output 430 in response to input 420. Weights 436 in this layer can be set by during training by analyzing the spatial temporal patterns of reservoir 406 after excitation by known inputs used as training data. This training can be performed off-line or online during processing of input signals.

In the illustrative example, the training continues during processing of input signals to enable reservoir computer 400 operate adaptively in predicting outputs. In other words, reservoir computer 400 can operate as an adaptive predictable filter to filter low frequency signals such as very low frequency signals and ultra low frequency signals.

Output 430 comprises predicted low frequency signals 432. These predicted low frequency signals are a prediction of low frequency signals 205 that will be received. In this illustrative example, this prediction does not predict noise 226. As result, noise 226 does not pass through reservoir computer 400. In this example, predicted low frequency signals form denoised signals 224. Denoised signals 224 in output 430 can be processed to extract communication signal 220.

In this illustrative example, delay embedding 402 creates a temporal record of reservoir states 416 in reservoir computer 400. Delay embedding 402 can be used to perform delay embedding on input 420 and send the delay embedded input signals into reservoir computer 400. Delay embedding 402 can apply delay embedding be applied to reservoir states 416 to provide history of reservoir dynamics.

In this illustrative example, weight adaptation 404 adapts output 430 from reservoir computer 400 through setting weights 436 in a gradient descent to produce a prediction of an input signal at a step in time in the future in the form of predicted low frequency signals 432. With the noise in input 420 being inherently random and unpredictable, predicted low frequency signals 432 generated is free of noise to form denoised signals 224.

Error 434 between the predicted low frequency signals 432 and low frequency signals 205 in input 420 is used by weight adaptation 404 to further modify weights 436 in readout layer 408 in reservoir computer 400 using an iterative process. In this example, the weights 436 can be adjusted for each new input sample. This process is iterative in a manner that will adapt to a changing input signal, not just iteration to a fixed signal.

Further, filter system 300 can be implemented in reservoir computer 400 provide desired filtering. This desired filtering can include implementing at least one of bandpass filter 304 or band reject filter 306.

In this illustrative example, poles 314 for filters in filter system 300 can be implemented in reservoir computer 400 by setting connectivity weights 414 between nodes 410. The implementation of a pole in poles 314 involves using two nodes in nodes 410.

In this example, zeros 316 for a filter can be implemented as weights 436 in readout layer 408. These different weights can be set by weight adaptation 404.

In this manner, filter system 300 can be implemented within reservoir computer 400 to include bandpass filter 304 to pass very low frequency signals 208 in frequency range 308 in which the communications signal 220 is expected be present in the very low frequency signals 208 received from low frequency receiver 212. Filter system can also be implemented in reservoir computer 400 to implement band reject filter 306 to reject frequency range 308 in very low frequency signals 208 in which the direct current (DC) bias 310 is present from the magnetic field of the earth.

Thus, in this illustrative example, cognitive signal processor 223 operates as an adaptive predictable filter to remove noise and other undesired artifacts from low frequency signals input into cognitive signal processor 223. Cognitive signal processor 223 outputs denoised signals 224 from which communications signal 220 can be extracted.

Further, parameters 450 in reservoir computer 400 can be set in readout layer 408. Parameters 450 can include, for example, learning rate 452, forgetting rate 454, and filter length 456.

The setting of these parameters can depend on various factors. For example, increasing learning rate 452 can be increased to increase responsiveness, but accuracy can be reduced from lower noise reduction. As learning rate 452 increases, reservoir computer 400 will more closely follow input 420. However, the reduction of noise 226 in low frequency signals 205 decreases. Further, with low frequency signals 205 having a relatively low bandwidth as compared to other types of communication signals, learning rate 452 can be reduced, which also aids in reducing noise 226.

Forgetting rate 454 is used to decay the states of filtering by reservoir computer 400. If forgetting rate 454 is not set, the reservoir computer 400 adapts to low frequency signals 205 but when low frequency signals 205 disappear, reservoir computer 400 can still generate output 430 as a smooth representation of the earlier low frequency signals.

In this illustrative example, forgetting rate 454 can be set so that a single dropout change in signal modulation is recognized anytime that is only a fraction of the signal bandwidth. For example, the fraction can be a 1/signal bandwidth. As the forgetting rate 454 decreases, a longer latency is present in recognizing when a signal has dropped out or ends.

In this illustrative example, filter length 456 defines the number of samples used to generate predicted low frequency signals 432. In one illustrative example, 20 samples can be used to obtain a desired level of accuracy in predicted low frequency signals 432. If the speed at which low frequency signals 205 change decreases, filter length 456 can be increased. When low frequency signals 205 increase in the speed at which they change, filter length 456 can be decreased.

Further, filter length 456 can be selected to also provide for oversampling. Oversampling involves sampling beyond a Nyquist required sampling rate.

In the illustrative examples, communications using low frequency signals 205 can have bandwidths of less than several thousand Hertz. With these bandwidths, increasing the filter length is not an issue with respect to implementing these processes to obtain a desired level of accuracy in predicted low frequency signals 432.

The illustration of parameters 450 in this example is provided as an illustration of some of parameters 450 that can be implemented in readout layer 408. Other parameters are also present with settings that can also be made in processing low frequency signals 205 in input 420. These parameters are selected as examples of parameters 450 that can be used to increase the accuracy in predicted low frequency signals 432 for denoised signals 224 in output 430.

In one illustrative example, one or more technical solutions are present that overcome a technical problem with at least one of receiving very low frequency signals at desired deaths in the ocean or at desired rates. As a result, one or more technical solutions can provide a technical effect in enabling a greater reduction of noise that increases the signal-to-noise ratio in a manner that enables at least one of receiving very low frequency signals at a greater depth or increased bit rate.

The illustration of communications environment 200 and the different components in communications environment 200 in FIGS. 2-4 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.**

For example, communications system 202 can be implemented in platform 201 that operates in other locations other than under water 210. For example, platform 201 can be some other type of platform other than underwater platform 204. For example, the platform 201 can be, an aircraft, a surface ship, a tank, a personnel carrier, a train, a spacecraft, a space station, a satellite, an automobile, a power plant, a bridge, a dam, a house, a manufacturing facility, building and other suitable platforms.

Further, communications system 202 can include other components not depicted in this block diagram. For example, communications system 202 can include an antenna, power source, or other suitable ones. One illustrative example is described in which communications signal 220 is received with very low frequency signals 208. In other illustrative examples, communications signal 220 can be received with extremely low frequency (ELF) signals 209 or ultra low frequency signals 207 when low frequency receiver 212 can receive extremely low frequency (ELF) signals 209 or ultra low frequency signals 207.

In one illustrative example, reservoir 406 has connections 412 that are fixed connection. These fixed connections form an array of passive oscillators with user defined resonant frequencies and quality (Q) factors.

With this example, input 420 is mapped into the impulse responses of the oscillators in reservoir 406. Readout layer 408 combines the delayed output values of each oscillator output with adaptable weights that are determined online via the gradient descent update equation. The quadratic error signal to be minimized during the gradient descent update is the L2 norm of the delayed output and input. This corresponds to a short time signal prediction process. This algorithm implements an online learning process where the number of delays and time delay values between delayed taps are estimated from the delay embedding theory implemented in delay embedding 402.

The delayed reservoir computer output will converge to the input signal in input 420. By this process most of the noise is eliminated from the output signal in output 430. In this illustrative example, delay embedding 402 is used to apply delay embedding for the reservoir state functions and used to predict the input signal by adaptively combining the delayed versions of the states. Since the noise is not predictable this process generates a denoised version of the input signal. Reservoir 406 with delay embedded states for embedded states 416 can be configured to have the same behavior as reservoirs with delay embedded inputs. The time history of these reservoir states can be used to perform short-term predictions of observations such as predicting the noisy input signal.

Figure 5:
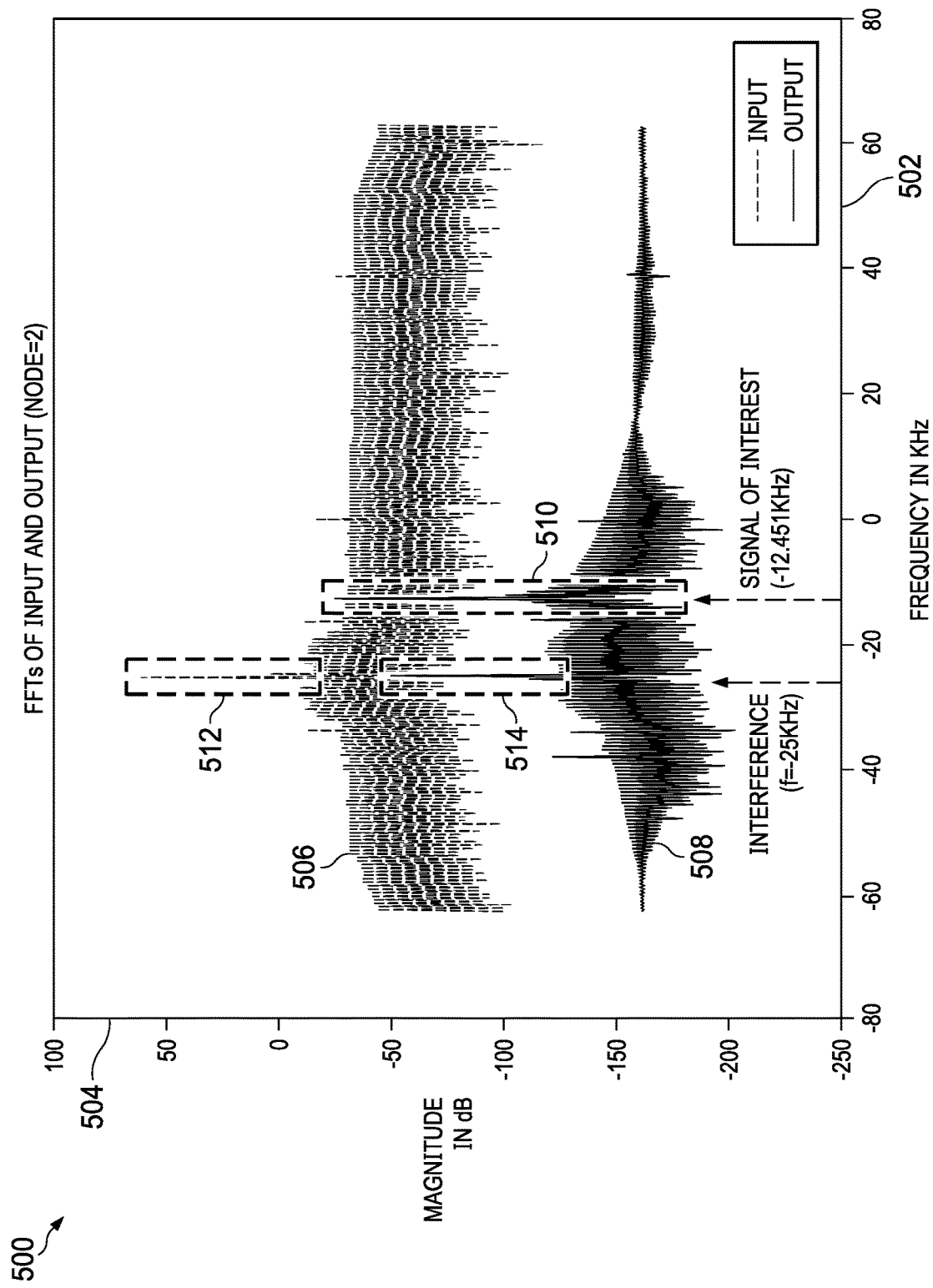
FIG. 5 is an illustration of a graph of a low frequency signals processed by a cognitive signal processor to generate a denoised signal in accordance with an illustrative embodiment.

Turning now to FIG. 5, an illustration of a graph of a low frequency signals processed by a cognitive signal processor to generate a denoised signal is depicted in accordance with an illustrative embodiment. As depicted, graph 500 plots data for very low frequency signals with X axis 502 representing frequency in kHz and y-axis 504 representing magnitude in decibels (dB). Data points 506 represent a fast Fourier transform of input very low frequency signals input into a cognitive signal processor such as cognitive signal processor 223 shown in FIG. 2 and FIG. 4. Data points 508 illustrate output very low frequency signals output in response to processing input very low frequency signals.

As depicted in graph 500, section 510 illustrates a spike in the low frequency signals that represents a communication signal that now stands out from the noise in other data points and data points 508 because of an increased signal to noise ratio. Data points 506 do not show the communications signal.

Filtering to remove a DC bias caused by the Earth's magnetic field is not shown in this particular example. As depicted, section 512 in data points 506 represent a DC bias caused by the Earth's magnetic field. This DC bias is also seen in section 514 in data points 508.

Figure 6:
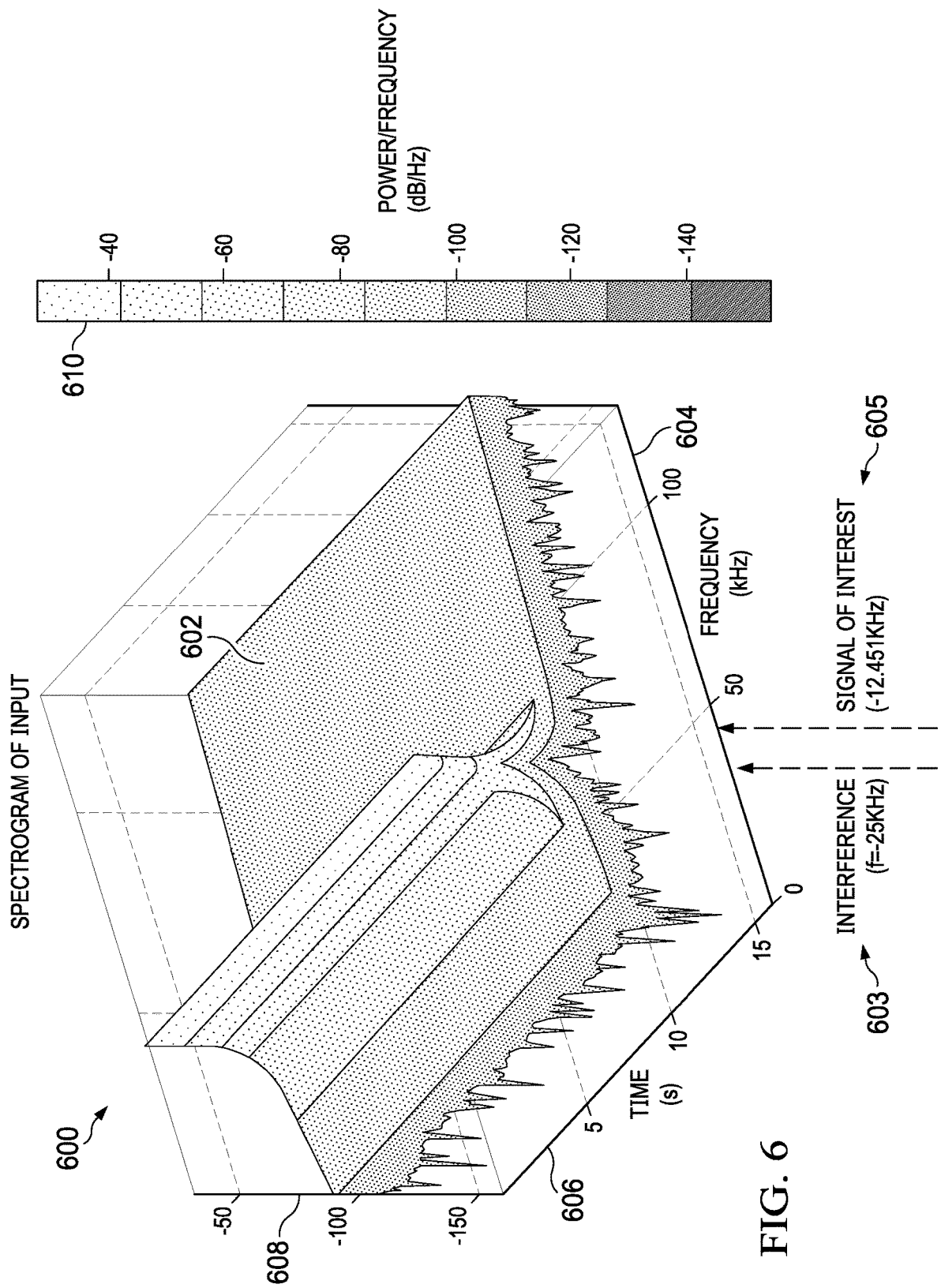
FIG. 6 is an illustration of the spectrogram of a low frequency signals input into a cognitive signal processor in accordance with an illustrative embodiment.

With reference to FIG. 6, an illustration of the spectrogram of a low frequency signals input into a cognitive signal processor is depicted in accordance with an illustrative embodiment. In graph 600, a spectrogram of input very low frequency signals is depicted. Data points 602 for input very low frequency signals are provided in graph 600 with X axis 604 representing frequency in kHz, Y axis 606 representing time in seconds, and z-axis 608 representing magnitude in dB. The ratio of power to frequency in dB/Hz in data points 602 is represented by scale 610.

In graph 600, a DC bias is interference 603 that is visible at 25 kHz in data points 602. This DC bias is caused by the Earth's magnetic field having a frequency of zero. In this illustrative example, the frequency is zero but shown at −25 KHZ because of a 25 kHz shift in the data during processing.

In this illustrative example, the communications signal is signal of interest 605 and has a frequency of −12.451 kHz in the very low frequency signals. The communications signal in this example has a strength of −125 dB but is not seen within the noise in input very low frequency signals represented by data points 602.

Figure 7:
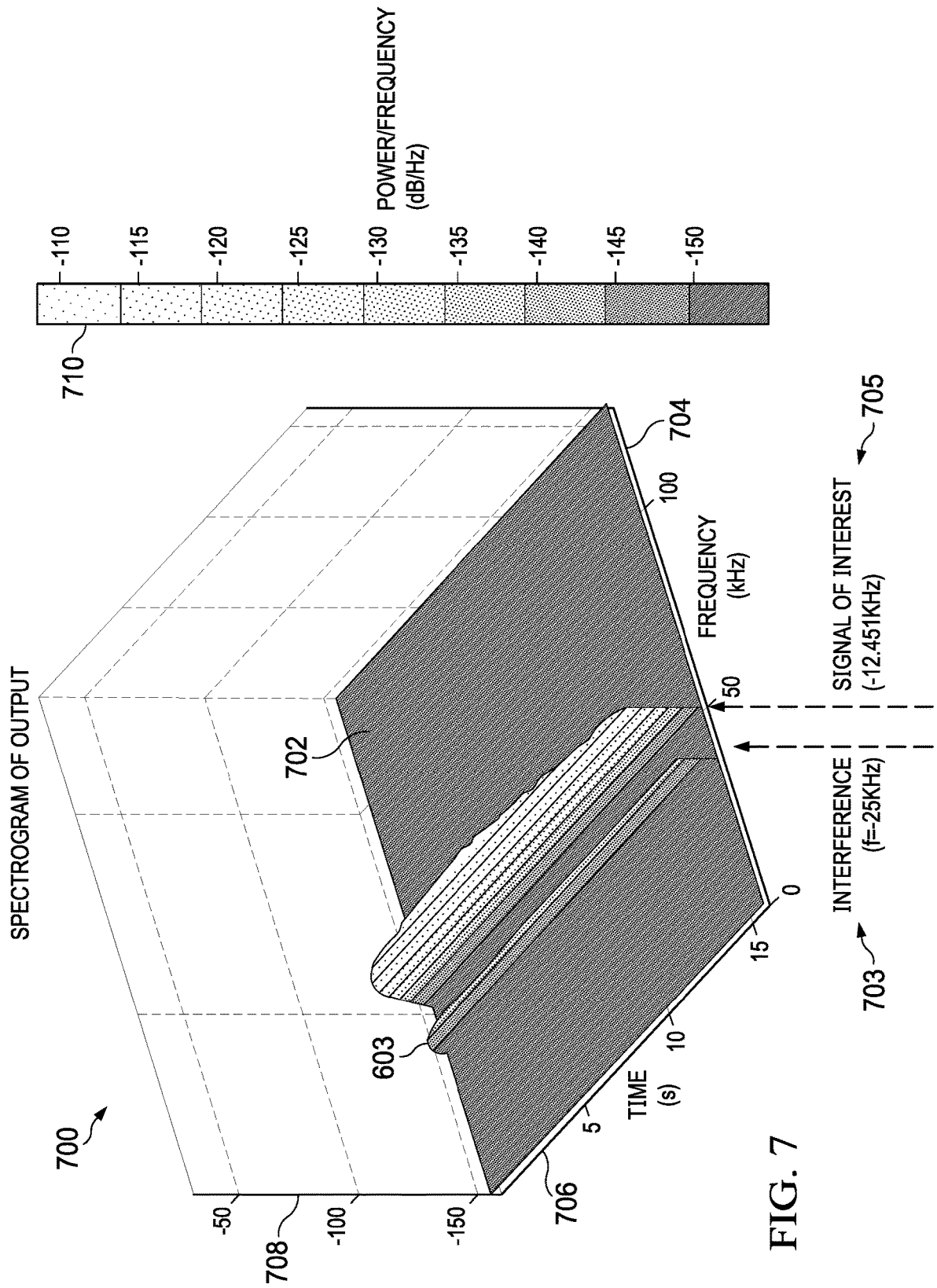
FIG. 7 is an illustration of the spectrogram of output low frequency signals resulting denoising input very low frequency signals using a cognitive signal processor in accordance with an illustrative embodiment.

In this illustrative example, input very low frequency signals represented by data points 602 in graph 600 are processed using a cognitive signal processor such as cognitive signal processor 223 shown in FIG. 2 and FIG. 4. In FIG. 7, an illustration of the spectrogram of output low frequency signals resulting denoising input very low frequency signals using a cognitive signal processor is depicted in accordance with an illustrative embodiment. As depicted, graph 700 represents a spectrogram of output very low frequency signals generated in response to very low frequency signals for data points 702 in FIG. 6. Data points 602 for output very low frequency signals are provided in graph 700 with X axis 704 representing frequency in kHz, Y axis 706 representing time in seconds, and z-axis 708 representing magnitude in decibels (dB). The ratio of power to frequency in dB/Hz in data points 702 is represented by scale 610.

In this illustrative example, the DC bias represented by interference 703 in data points 702 at −25 kHz is greatly reduced to about −150 dB. As depicted, signal of interest 705 for communications signal at −12.451 kHz can now be seen at about −125 dB on graph 700. As can be seen in graph 700, the denoising increases the signal-to-noise ratio in a manner that makes extracting the communications signal easier than without using a cognitive signal processor to remove noise.

Figure 8:
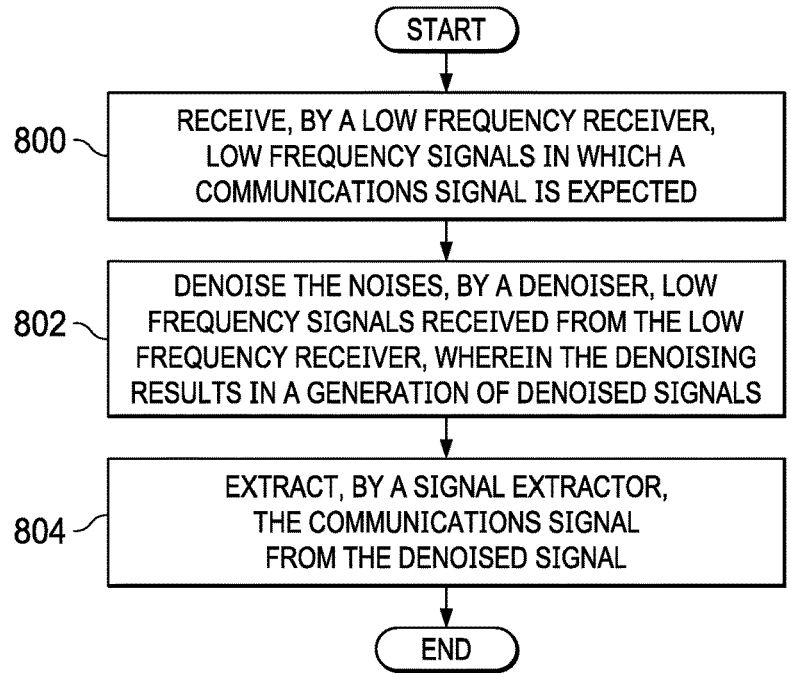
FIG. 8 is an illustration of a flowchart of a process for processing low frequency signals in accordance with an illustrative embodiment.

Turning next to FIG. 8, an illustration of a flowchart of a process for processing low frequency signals is depicted in accordance with an illustrative embodiment. The process in FIG. 8 can be implemented in hardware, software, or both. When implemented in software, the process can take the form of program code that is run by one of more processor units located in one or more hardware devices in one or more computer systems. For example, the process can be implemented in computer system 218 in Communications system 202 in FIG. 2.

The process begins by receiving, by a low frequency receiver, low frequency signals in which a communications signal is expected (operation 800). The process the noises, by a denoiser, low frequency signals received from the low frequency receiver, wherein the denoising results in a generation of denoised signals (operation 802).

The process extracts, by a signal extractor, the communications signal from the denoised signal (operation 804). The process terminates thereafter.

Figure 9:
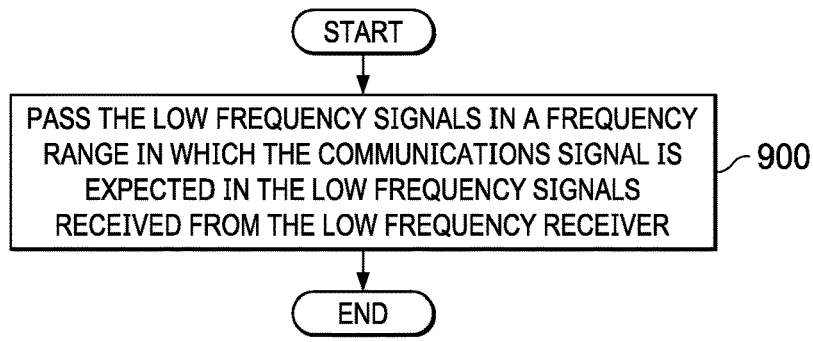
FIG. 9 is an illustration of a flowchart of a process for denoising the noisy low frequency signals in accordance with an illustrative embodiment.

With reference now to FIG. 9, an illustration of a flowchart of a process for denoising the noisy low frequency signals is depicted in accordance with an illustrative embodiment. The process illustrated in FIG. 9 is an example of one implementation for operation 802 in FIG. 8.

Figure 10:
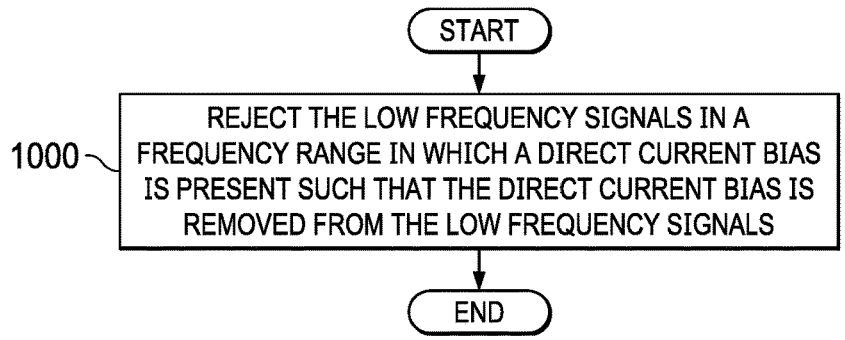
FIG. 10 is an illustration of a flowchart of a process for denoising the low frequency signals in accordance with an illustrative embodiment.

The process passes the low frequency signals in a frequency range in which the communications signal is expected in the low frequency signals received from the low frequency receiver (operation 900). The process terminates thereafter. In other words, only a portion of the low frequency signals received from the low frequency receiver are passed through during the noisy signals. This frequency range can be continuous or discontinuous frequency range. In other words, gaps may be present in frequency range to further fine tune what frequencies are passed for further processing In FIG. 10, an illustration of a flowchart of a process for denoising the low frequency signals is depicted in accordance with an illustrative embodiment. The process illustrated in FIG. 10 is an example of one implementation for operation 802 in FIG. 8.

The process rejects the low frequency signals in a frequency range in which a direct current bias is present such that the direct current bias is removed from the low frequency signals (operation 1000). The process terminates thereafter. In operation 1000, artifacts or constant noise can be removed from the low frequency signals. These artifacts can be, for example, a direct DC bias caused by the magnetic field of the earth having essentially a zero frequency.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware can, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 11:
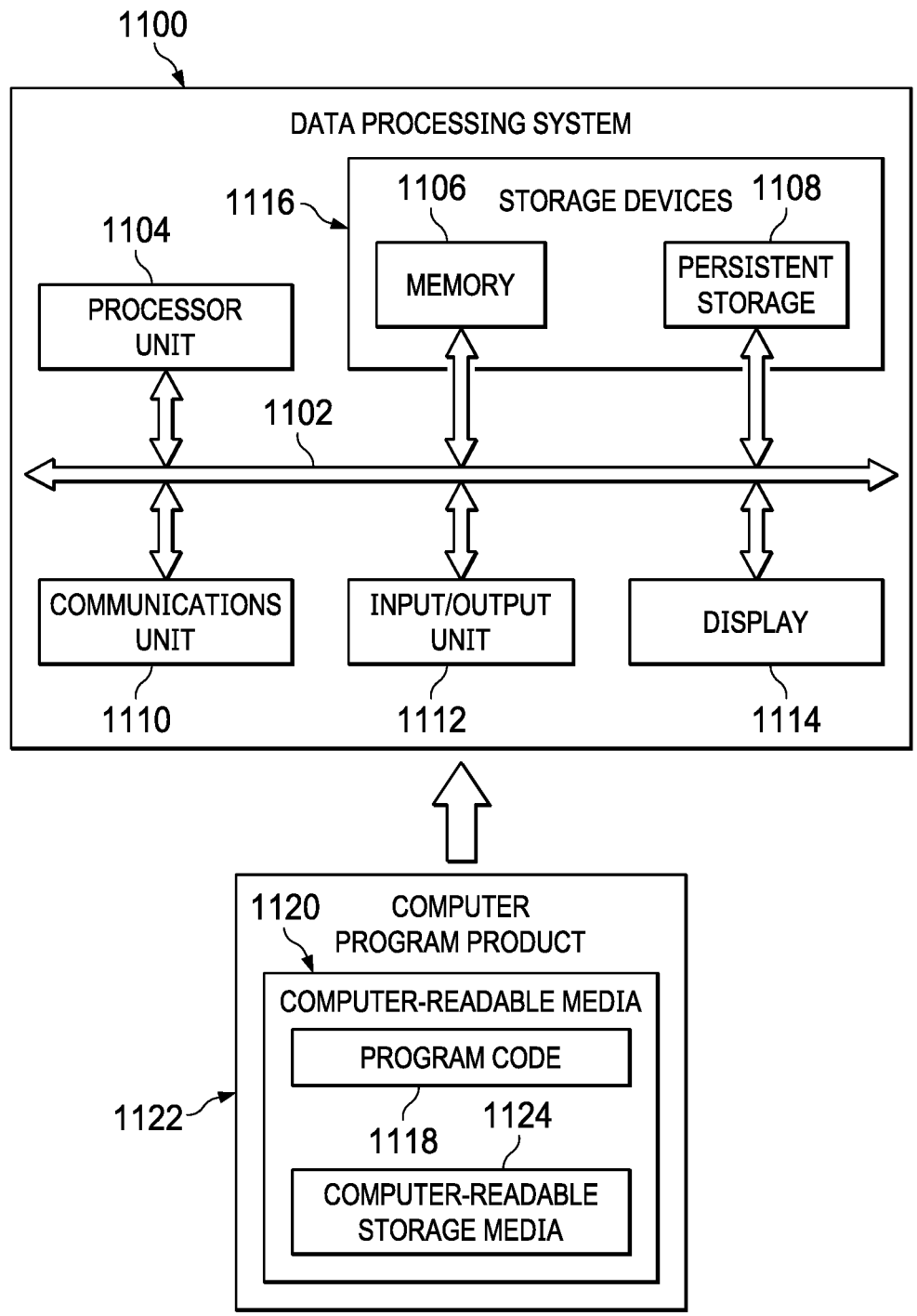
FIG. 11 is an illustration of a block diagram of a data processing system in accordance with an illustrative embodiment.

Turning now to FIG. 11, an illustration of a block diagram of a data processing system is depicted in accordance with an illustrative embodiment. Data processing system 1100 can be used to implement computer system 218 in FIG. 2. In this illustrative example, data processing system 1100 includes communications framework 1102, which provides communications between processor unit 1104, memory 1106, persistent storage 1108, communications unit 1110, input/output (I/O) unit 1112, and display 1114. In this example, communications framework 1102 takes the form of a bus system.

Processor unit 1104 serves to execute instructions for software that can be loaded into memory 1106. Processor unit 1104 includes one or more processors. For example, processor unit 1104 can be selected from at least one of a multicore processor, a central processing unit (CPU), a graphics processing unit (GPU), a physics processing unit (PPU), a digital signal processor (DSP), a network processor, or some other suitable type of processor. Further, processor unit 1104 can may be implemented using one or more heterogeneous processor systems in which a main processor is present with secondary processors on a single chip. As another illustrative example, processor unit 1104 can be a symmetric multi-processor system containing multiple processors of the same type on a single chip.

Memory 1106 and persistent storage 1108 are examples of storage devices 1116. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1116 may also be referred to as computer-readable storage devices in these illustrative examples. Memory 1106, in these examples, can be, for example, a random-access memory or any other suitable volatile or non-volatile storage device. Persistent storage 1108 can take various forms, depending on the particular implementation.

For example, persistent storage 1108 may contain one or more components or devices. For example, persistent storage 1108 can be a hard drive, a solid-state drive (SSD), a flash memory, a rewritable optical disk, a rewritable magnetic tape, or some combination of the above. The media used by persistent storage 1108 also can be removable. For example, a removable hard drive can be used for persistent storage 1108.

Communications unit 1110, in these illustrative examples, provides for communications with other data processing systems or devices. In these illustrative examples, communications unit 1110 is a network interface card.

Input/output unit 1112 allows for input and output of data with other devices that can be connected to data processing system 1100. For example, input/output unit 1112 can provide a connection for user input through at least one of a keyboard, a mouse, or some other suitable input device. Further, input/output unit 1112 can send output to a printer. Display 1114 provides a mechanism to display information to a user.

Instructions for at least one of the operating system, applications, or programs can be located in storage devices 1116, which are in communication with processor unit 1104 through communications framework 1102. The processes of the different embodiments can be performed by processor unit 1104 using computer-implemented instructions, which can be located in a memory, such as memory 1106.

These instructions are program instructions and are also referred to as program code, computer usable program code, or computer-readable program code that can be read and executed by a processor in processor unit 1104. The program code in the different embodiments can be embodied on different physical or computer-readable storage media, such as memory 1106 or persistent storage 1108.

Program code 1118 is located in a functional form on computer-readable media 1120 that is selectively removable and can be loaded onto or transferred to data processing system 1100 for execution by processor unit 1104. Program code 1118 and computer-readable media 1120 form computer program product 1122 in these illustrative examples. In the illustrative example, computer-readable media 1120 is computer-readable storage media 1124.

Computer-readable storage media 1124 is a physical or tangible storage device used to store program code 1118 rather than a media that propagates or transmits program code 1118. Computer readable storage media 1124, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program code 1118 can be transferred to data processing system 1100 using a computer-readable signal media. The computer-readable signal media are signals and can be, for example, a propagated data signal containing program code 1118. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 1120" can be singular or plural. For example, program code 1118 can be located in computer-readable media 1120 in the form of a single storage device or system. In another example, program code 1118 can be located in computer-readable media 1120 that is distributed in multiple data processing systems. In other words, some instructions in program code 1118 can be located in one data processing system while other instructions in program code 1118 can be located in one data processing system. For example, a portion of program code 1118 can be located in computer-readable media 1120 in a server computer while another portion of program code 1118 can be located in computer-readable media 1120 located in a set of client computers.

The different components illustrated for data processing system 1100 are not meant to provide architectural limitations to the manner in which different embodiments can be implemented. In some illustrative examples, one or more of the components may be incorporated in or otherwise form a portion of, another component. For example, memory 1106, or portions thereof, can be incorporated in processor unit 1104 in some illustrative examples. The different illustrative embodiments can be implemented in a data processing system including components in addition to or in place of those illustrated for data processing system 1100. Other components shown in FIG. 11 can be varied from the illustrative examples shown. The different embodiments can be implemented using any hardware device or system capable of running program code 1118.

Some features of the illustrative examples are described in the following clauses. These clauses are examples of features not intended to limit other illustrative examples.

Clause 1

A communications system comprising:
  a low frequency receiver that receives low frequency signals in which a communications signal is expected;
  a denoiser in communication with the low frequency receiver, wherein the denoiser denoises low frequency signals received from the low frequency receiver, wherein the denoising results in a generation of denoised signals; and
  a signal extractor in communication with the denoiser, wherein the signal extractor extracts the communications signal from the denoised signal.

Clause 2

The communications system according to clause 1 further comprising:
  a reservoir in the denoiser, wherein the reservoir the low frequency signals.

Clause 3

The communications system according to one of clauses 1 or 2 further comprising:
  a bandpass filter in the reservoir in the denoiser, wherein the bandpass filter passes the low frequency signals in a frequency range in which the communications signal is expected in the low frequency signals received from the low frequency receiver.

Clause 4

The communications system according to 2 further comprising:
  a band reject filter in the reservoir in the denoiser, wherein the band reject filter rejects the low frequency signals in a frequency range in which a direct current bias is present such that the band reject filter removes the direct current bias in the low frequency signals.

Clause 5

The communications system according to one of clauses 1, 2, 3, or 4 further comprising:

a filter system in the denoiser, wherein the filter system comprises at least one of a bandpass filter or a band reject filter.

Clause 6

The communications system according to clause 5, wherein the filter system passes at least one of a set of frequency ranges or rejects a set of frequency ranges.

Clause 7

The communications system according to one of clauses according to one of clauses 1, 2, 3, 4, 5, or 6, wherein the low frequency receiver selected from one of magnetometer very low frequency receiver, and a quantum magnetometer very low frequency receiver, or a magnetic field-based quantum receiver.

Clause 8

The communications system according to one of clauses 1, 2, 3, 4, 5, 6, or 7, wherein the denoiser is a cognitive signal processor.

Clause 9

The communications system according to one of clauses 1, 2, 3, 4, 5, 6, 7, or 8, wherein the low frequency signals comprises at least one of extremely low frequency (ELF) signals, ultra low frequency signals, or very low frequency signals.

Clause 10

The communications system according to one of clauses 1, 2, 3, 4, 5, 6, 7, 8, or 9 further comprising:
an underwater platform, wherein the low frequency receiver, the denoiser, and the signal extractor are located in the underwater platform.

Clause 11

The communications system according to clause 10, wherein the underwater platform is selected from a group comprising a stationary underwater platform, a mobile underwater platform, a submarine, a submersible vehicle, an autonomous underwater vehicle, an underwater research station, an underwater habitat, an underwater drone, and an underwater remotely operated vehicle.

Clause 12

A communications system comprising:
a quantum magnetometer very low frequency receiver that detects very low frequency signals;
a cognitive signal processor in communication with quantum magnetometer very low frequency receiver, wherein the cognitive signal processor denoises very low frequency signals received from the quantum magnetometer very low frequency receiver, wherein the denoising results in a generation of denoised signals;
a filter system in a neural network in the cognitive signal processor, wherein the filter system comprises at least one of a bandpass filter or a band reject filter; and
a signal extractor in communication with the cognitive signal processor, wherein the signal extractor extracts the communications signal from the denoised signal.

Clause 13

The communications system according to clause 12, wherein the bandpass filter passes the very low frequency signals in a frequency range in which the communications signal is expected in the very low frequency signals received from the quantum magnetometer very low frequency receiver.

Clause 14

The communications system according to one of clauses 12 or 13, wherein the band reject filter rejects the very low frequency signals in a frequency range in which a direct current bias is present such that the band reject filter removes the direct current bias in the very low frequency signals.

Clause 15

The communications system according to one of clauses 12, 13, or 14, wherein the cognitive signal processor comprises the neural network in a reservoir computer, a delay embedding, and a weight adaptation.

Clause 16

The communications system according to one of clauses 12, 13, 14, or 15 further comprising:
a platform, wherein the quantum magnetometer, the cognitive signal processor, and the signal extractor are located in the underwater platform.

Clause 17

The communications system according to clause 16, wherein the platform is selected from a group comprising a underwater platform, a stationary underwater platform, a mobile underwater platform, a submarine, a submersible vehicle, an autonomous underwater vehicle, an underwater research station, an underwater habitat, an underwater drone, and an underwater remotely operated vehicle, an aircraft, a surface ship, a tank, a personnel carrier, a train, a spacecraft, a space station, a satellite, an automobile, a power plant, a bridge, a dam, a house, a manufacturing facility, and a building.

Clause 18

A method for processing low frequency signals, the method comprising:
receiving, by a low frequency receiver, low frequency signals in which a communications signal is expected;
denoising, by a denoiser, low frequency signals received from the low frequency receiver, wherein the denoising results in a generation of denoised signals; and
extracting, by a signal extractor, the communications signal from the denoised signal.

Clause 19

The method according to clause 18, wherein denoising comprises:
passing the low frequency signals in a frequency range in which the communications signal is expected in the low frequency signals received from the receiver.

Clause 20

The method according to one of clauses 18 or 19, wherein denoising comprises:
rejecting the low frequency signals in a frequency range in which interference is present such that the interference is removed from the low frequency signals.

Clause 21

A computer program product for processing very low frequency signals, the computer program product comprising a computer readable storage medium having program code embodied therewith, the program code executable by a computer system to cause the computer system to perform a method of:
receiving, by a low frequency receiver, low frequency signals in which a communications signal is expected;
denoising, by a denoiser, low frequency signals received from the low frequency receiver, wherein the denoising results in a generation of denoised signals; and
extracting, by a signal extractor, the communications signal from the denoised signal.

Thus, the illustrative embodiments provide a method, apparatus, system, and computer program product for processing low frequency signals. A communications system comprises a low frequency receiver, a denoiser, and a signal extractor. The low frequency receiver receives low frequency signals in which a communications signal is expected. The denoiser is in communication with the low frequency receiver. The denoiser denoises low frequency signals received from the low frequency receiver. The denoising results in a generation of denoised signals. The signal extractor in communication with the denoiser. The signal extractor extracts the communications signal from the denoised signal.

With the use of a low frequency receiver and a denoiser a reduction of noise can be achieved that enables communication using at least one of an increased bit rate and detecting transmissions or an increased depth. With very low frequency implementations, the use of a quantum magnetometer very low frequency receiver with a cognitive signal processor can increase the reduction in noise. Further, with the implementation of a filter system having at least one of a bandpass filter to pass frequencies in which a communications signal is expected or reject frequencies in which artifacts such as a DC bias is expected. As a result, an increase in at least one of the bit rate or depth at which very low frequency signals can be received can occur.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, To the extent that terms "includes", "including", "has", "contains", and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A communications system comprising:
   a low frequency receiver that receives low frequency signals in which a communications signal is expected;
   a denoiser in communication with the low frequency receiver, wherein the denoiser comprises a cognitive signal processor comprising a reservoir computer comprising a reservoir that stores the low frequency signals and a readout layer, wherein the denoiser denoises the low frequency signals received from the low frequency receiver, wherein the denoising results in a generation of denoised signals; and
   a signal extractor in communication with the denoiser, wherein the signal extractor extracts the communications signal from the denoised signal.

2. The communications system of claim 1 further comprising:
   a bandpass filter in the reservoir in the denoiser, wherein the bandpass filter passes the low frequency signals in a frequency range in which the communications signal is expected in the low frequency signals received from the low frequency receiver.

3. The communications system of claim 1 further comprising:
   a band reject filter in the reservoir in the denoiser, wherein the band reject filter rejects the low frequency signals in a frequency range in which a direct current bias is present such that the band reject filter removes the direct current bias in the low frequency signals.

4. The communications system of claim 1 further comprising:
   a filter system in the denoiser, wherein the filter system comprises at least one of a bandpass filter or a band reject filter.

5. The communications system of claim 4, wherein the filter system passes at least one of a set of frequency ranges or rejects a set of frequency ranges.

6. The communications system of claim 1, wherein the low frequency receiver selected from one of magnetometer very low frequency receiver, and a quantum magnetometer very low frequency receiver, or a magnetic field-based quantum receiver.

7. The communications system of claim 1, wherein the low frequency signals comprises at least one of extremely low frequency (ELF) signals, ultra low frequency signals, or very low frequency signals.

8. The communications system of claim 1 further comprising:
   an underwater platform, wherein the low frequency receiver, the denoiser, and the signal extractor are located in the underwater platform.

9. The communications system of claim 8, wherein the underwater platform is selected from a group comprising a stationary underwater platform, a mobile underwater platform, a submarine, a submersible vehicle, an autonomous underwater vehicle, an underwater research station, an underwater habitat, an underwater drone, and an underwater remotely operated vehicle.

10. A communications system comprising:
    a quantum magnetometer very low frequency receiver that detects very low frequency signals;
    a cognitive signal processor in communication with quantum magnetometer very low frequency receiver, wherein the cognitive signal processor comprises a reservoir computer comprising a reservoir that stores the low frequency signals and a readout layer, wherein the cognitive signal processor denoises the very low frequency signals received from the quantum magnetometer very low frequency receiver, wherein the denoising results in a generation of denoised signals;
    a filter system in a neural network in the readout layer of the cognitive signal processor, wherein the filter system comprises at least one of a bandpass filter or a band reject filter; and
    a signal extractor in communication with the cognitive signal processor, wherein the signal extractor extracts a communications signal from the denoised signal.

11. The communications system of claim 10, wherein the bandpass filter passes the very low frequency signals in a frequency range in which the communications signal is expected in the very low frequency signals received from the quantum magnetometer very low frequency receiver.

12. The communications system of claim 10, wherein the band reject filter rejects the very low frequency signals in a frequency range in which a direct current bias is present such that the band reject filter removes the direct current bias in the very low frequency signals.

13. The communications system of claim 10, wherein the cognitive signal processor comprises a delay embedding, and a weight adaptation.

14. The communications system of claim 10 further comprising:
a platform, wherein the quantum magnetometer, the cognitive signal processor, and the signal extractor are located in an underwater platform.

15. The communications system of claim 14, wherein the platform is selected from a group comprising a underwater platform, a stationary underwater platform, a mobile underwater platform, a submarine, a submersible vehicle, an autonomous underwater vehicle, an underwater research station, an underwater habitat, an underwater drone, and an underwater remotely operated vehicle, an aircraft, a surface ship, a tank, a personnel carrier, a train, a spacecraft, a space station, a satellite, an automobile, a power plant, a bridge, a dam, a house, a manufacturing facility, and a building.

16. A method for processing low frequency signals, the method comprising:
receiving, by a low frequency receiver, low frequency signals in which a communications signal is expected;
denoising, by a denoiser, low frequency signals received from the low frequency receiver, wherein the denoiser comprises a cognitive signal processor comprising a reservoir computer comprising a reservoir that stores the low frequency signals and a readout layer, wherein the denoising results in a generation of denoised signals; and
extracting, by a signal extractor, the communications signal from the denoised signal.

17. The method of claim 16, wherein denoising comprises:
passing the low frequency signals in a frequency range in which the communications signal is expected in the low frequency signals received from the receiver.

18. The method of claim 16, wherein denoising comprises:
rejecting the low frequency signals in a frequency range in which interference is present such that the interference is removed from the low frequency signals.

19. A computer program product for processing very low frequency signals, the computer program product comprising a computer readable storage medium having program code embodied therewith, the program code executable by a computer system to cause the computer system to perform a method of:
receiving, by a low frequency receiver, low frequency signals in which a communications signal is expected;
denoising, by a denoiser comprising a cognitive signal processor comprising a reservoir computer comprising a reservoir and a readout layer, low frequency signals received from the low frequency receiver, wherein the reservoir stores the low frequency signals, and wherein the denoising results in a generation of denoised signals; and
extracting, by a signal extractor, the communications signal from the denoised signal.

20. The computer program product of claim 19, wherein the program code causes the computer system to pass the low frequency signals in a frequency range in which the communications signal is expected in the low frequency signals received from the receiver.

21. The computer program product of claim 19, wherein the program code causes the computer system to reject the low frequency signals in a frequency range in which interference is present such that the interference is removed from the low frequency signals.

* * * * *